UNITED STATES PATENT OFFICE.

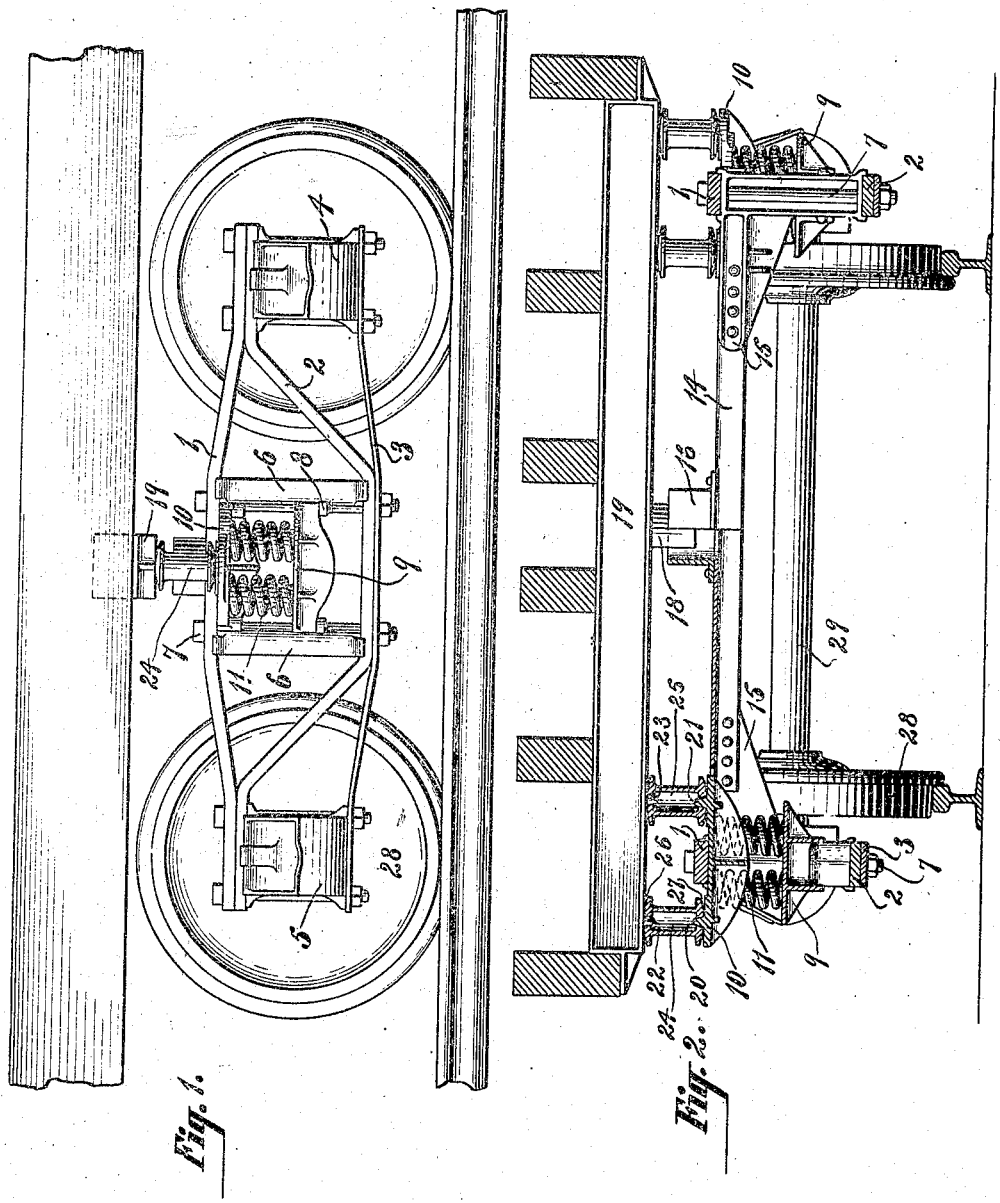

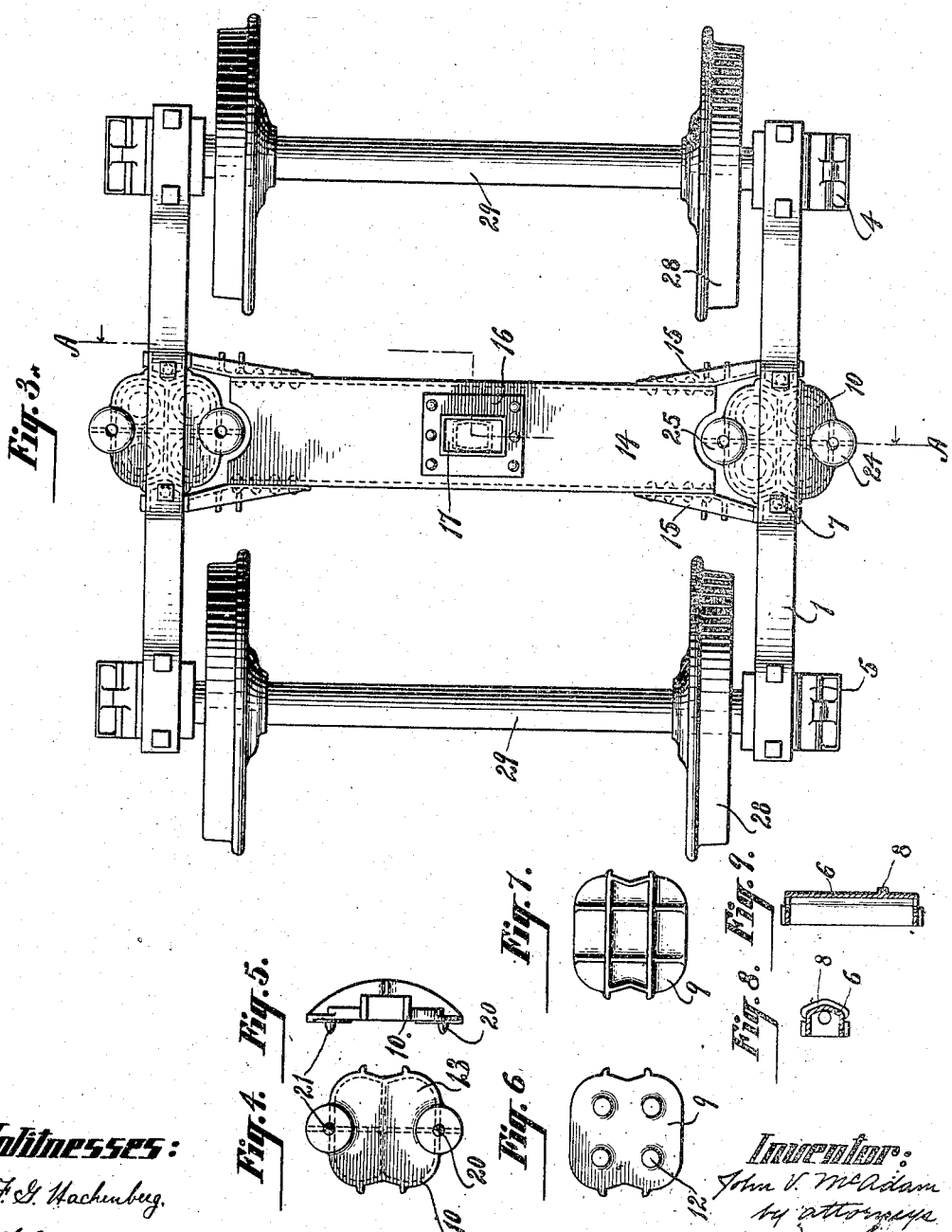

JOHN V. McADAM, OF NEW YORK, N. Y.

RAILWAY-CAR TRUCK.

No. 900,760.     Specification of Letters Patent.     Patented Oct. 13, 1908.

Application filed May 22, 1906. Serial No. 318,163.

*To all whom it may concern:*

Be it known that I, JOHN V. MCADAM, a citizen of the United States, and resident of the borough of Manhattan, in the city and State of New York, have invented a new and useful Improvement in Railway - Car Trucks, of which the following is a specification.

At present it is the usual practice in car construction to have the load of the car supported by the trucks at points between or off-set from the side frames. This construction requires the use of very heavy truck bolsters to properly transmit the load to the side frames and keep the side frames properly squared with respect to each other.

My invention consists in providing a structure in which the car load is supported upon the side frames independently of a truck bolster, the side frames of each pair being properly spaced apart by a cross connecting piece which receives none of the load of the car. This arrangement permits of a material reduction in the weight of the truck and also in the cost of manufacturing the same.

My invention consists further in providing certain improvements in the construction, form and arrangement of the several parts of a truck of this character having built up side frames, rocker bearings being interposed between the body of the car and the truck, which rocker bearings receive the entire weight of the car and transmit it to the truck.

In the accompanying drawings, Figure 1 represents the truck in side elevation, a portion of the car and the track also being shown, Fig. 2 is a transverse vertical section taken in the plane of the line A—A of Fig. 3 looking in the direction of the arrows, Fig. 3 is a top plan view of the truck, the rocker bearings being shown in position thereon, Figs. 4 and 5 show one of the spring caps in top plan and end elevation, Figs. 6 and 7 show one of the spring seats in top plan and bottom plan, respectively, and Figs. 8 and 9 are transverse and vertical sections, respectively, of one of the guides for the spring cap.

The truck herein shown has built up side frames as follows:—The top arch bar of each side frame is denoted by 1 and the bottom arch bar by 2 and the tie bar by 3. The ends of the top and bottom arch bars are brought together as usual at the tops of the journal boxes 4 and 5 while the ends of the tie bars 3 are located at the bottoms of the said journal boxes.

The top and bottom arch bars 1 and 2 intermediate their ends are connected by two vertical columns 6 forming spring cap guides rigidly spaced apart and secured to the top and bottom arch bars by through bolts 7. These columns are provided with shoulders 8 on which the spring seat 9 rests.

The spring cap is denoted by 10 and it is fitted to slide vertically between the columns 6. Springs 11 are interposed between the spring seat 9 and spring cap 10. In the present instance four coil springs 11 are shown, the spring seat being provided with four upwardly extended lugs 12 for centering the lower ends of the spring and the spring cap 10 is provided with a series of partitions forming four pockets 13 for receiving and positioning the upper ends of the said springs.

The two built up side frames are spaced apart and squared with respect to each other by a cross connecting piece 14, the end of which connecting piece is riveted between arms 15 formed integral with and projecting inwardly from the spring cap guides 6. This cross connecting piece 14 is provided with a collar 16 having a transversely elongated opening 17 therein for receiving the usual depending thimble 18 of the body bolster 19 of the car.

Rocker bearings are interposed between the body bolster 19 and each of the spring caps 10 for transmitting the weight of the car to the side frames independently of a truck bolster as distinguished from applying the weight of the car onto a truck bolster between the said frames as is now common. These rocker bearings, in the present instance are constructed and arranged as follows: Each cap 12 is provided with two teats or lugs 20, 21, uprising therefrom outside and inside of the side frame. The body bolster 19 is provided with depending teats or lugs 22, 23, opposite to the lugs 20, 21, on the spring cap. Rocker bearing pieces 24, 25, are interposed between the body bolster 19 and the spring cap 10, the piece 24 being held in position by the lugs 20, 22, and the piece 25 being held in position by the lugs 21, 23. The top and bottom of each of these pieces may be of spherical form as shown at 26, 27, and the engagement of these pieces with their lugs is such that the body bolster 19 of the car may have a limited movement in any direction, the tops and bottoms of the pieces 24, 25, serving as a rocking bearing between each spring cap 10 and the body bolster.

The truck wheels are denoted by 28 and the axles by 29.

From the construction herein set forth it will be seen that the use of a truck bolster is obviated as the load of the car is supported by the side frames through the springs 11, spring caps 10 and rocker bearings.

It is to be understood that these rocker bearings may be made in various shapes and sizes to suit different requirements; also that the form of the side frames and connecting piece may be varied from that shown and described therein, and that various changes might be made without departing from the spirit and scope of my invention; hence I do not wish to limit myself strictly to the construction herein set forth, but

What I claim is:—

1. The combination with the built up side frame of a railway car truck, of a car body and rocker bearings having a limited rocking movement in all directions, interposed between the car body and the truck for supporting the car load symmetrically over the side frames independently of a truck bolster.

2. The combination with the built up side frames of a railway car truck, of a car body bolster, and rocker bearings having a limited rocking movement in all directions, interposed between the body bolster and the truck for supporting the car load symmetrically over the side frames independently of a truck bolster.

3. The combination with the built up side frames of a railway car truck, of a car body and means for supporting the car load symmetrically over the side frames independently of a truck bolster, comprising springs seated in the side frames and rocker bearings having a limited rocking movement in all directions, interposed between the springs and the car body.

4. The combination with the built up side frames of a railway car truck, of a car body bolster and means for supporting the car load symmetrically over the side frames independently of a truck bolster, comprising springs seated in the side frames and rocker bearings having a limited rocking movement in all directions, interposed between the springs and the car body bolster.

5. The combination with the built up side frames of a railway car truck, of a car body and means for supporting the car load symmetrically over the side frames independently of a truck bolster, comprising springs seated in the side frames, spring caps and rocker bearings having a limited rocking movement in all directions, interposed between the spring caps and the car body.

6. The combination with the built up side frames of a railway car truck, of a car body bolster and means for supporting the car load symmetrically over the side frames independently of a truck bolster, comprising springs seated in the side frames, spring caps and rocker bearings having a limited rocking movement in all directions, interposed between the spring caps and the car body bolster.

7. The combination with the built up side frames of a railway car truck, said side frames having spring cap guides, of a car body, spring seats supported between said guides, spring caps fitted to slide in said guides and springs interposed between the seats and caps, the said caps serving to receive the car load and apply it to the side frames independently of a truck bolster.

8. The combination with the built up side frames of a railway car truck, said side frames having spring cap guides, of a car body bolster, spring seats supported between said guides, spring caps fitted to slide in said guides, and springs interposed between the seats and caps, the said caps serving to receive the car load and apply it to the side frames independently of a truck bolster.

9. The combination with the built up side frames of a railway car truck, said side frames having spring cap guides, of a car body, spring seats supported between said guides, spring caps fitted to slide in said guides, springs interposed between the seats and caps and rocker bearings interposed between the caps and car body.

10. The combination with the built up side frames of a railway car truck, said side frames having spring cap guides, of a car body bolster, spring seats supported between said guides, spring caps fitted to slide in said guides, springs interposed between the seats and caps and rocker bearings interposed between the caps and the body bolster.

11. The combination with the built up side frames of a railway car truck, said side frames having spring cap guides, of a car body, spring caps fitted to slide in said guides and projecting upon both sides of each side frame, springs interposed between the caps and side frames and rocker bearing pieces upon both sides of each side frame interposed between the spring cap and car body.

12. The combination with the built up side frames of a railway car truck, said side frames having spring cap guides, of a car body bolster, spring caps fitted to slide in said guides, and projecting upon both sides of each side frame, springs interposed between the caps and side frames and rocker bearing pieces upon both sides of each side frame interposed between the spring cap and the body bolster.

In testimony, that I claim the foregoing as my invention, I have signed my name in presence of two witnesses, this 15th day of May 1906.

JOHN V. McADAM.

Witnesses:
FREDK. HAYNES,
HENRY THIEME.